Patented July 20, 1948

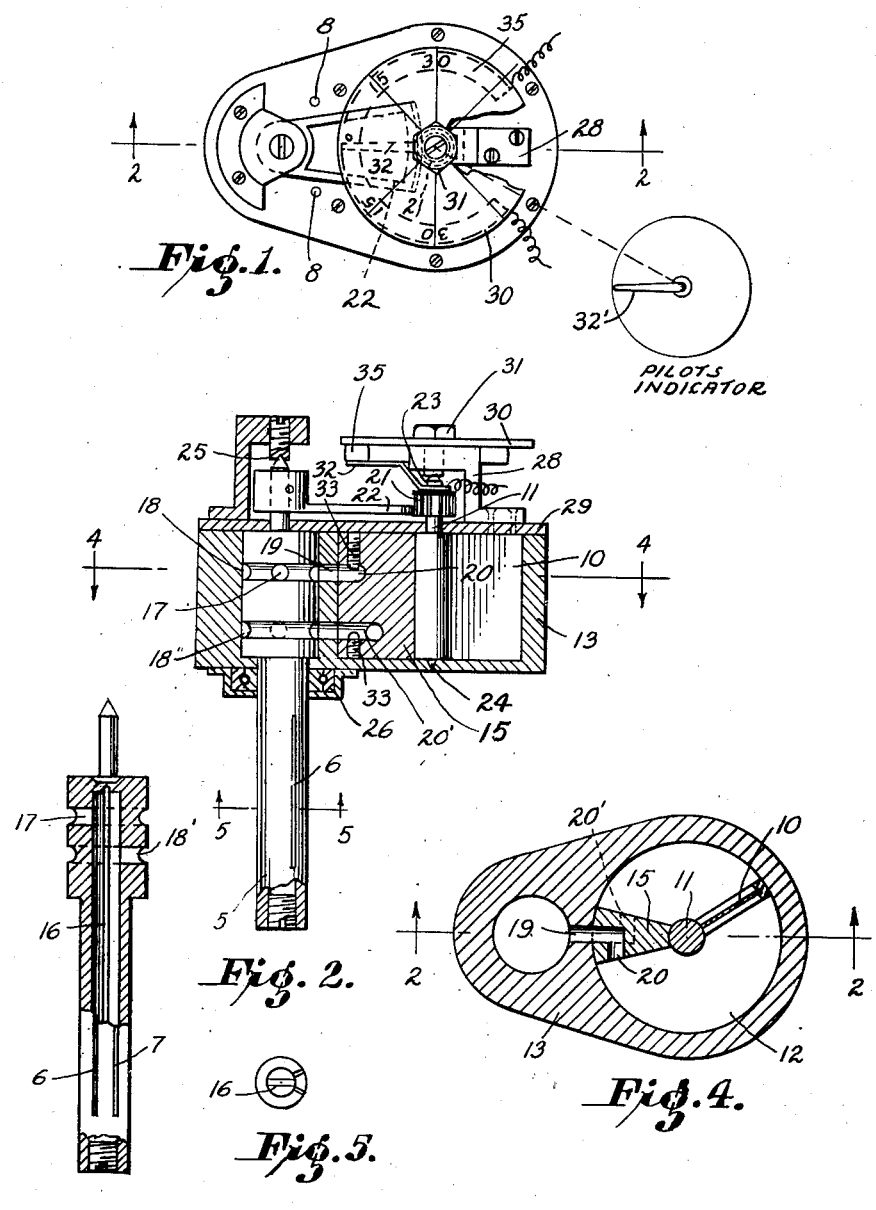

2,445,746

UNITED STATES PATENT OFFICE 2,445,746

FLUID STREAM DIRECTION INDICATOR

August Raspet, Locust Valley, N. Y., assignor to Specialties, Inc.

Application April 11, 1946, Serial No. 661,271

5 Claims. (Cl. 73—188)

The present invention relates to instruments for indicating the direction of an air-stream or other fluid flow past a given point.

The invention has been developed more particularly to provide an improved instrument for indicating the direction of the air-stream relative to any fixed axis of an airplane and thereby indicating yaw of the airplane or the attitude in a vertical plane. For convenience of disclosure of the principles of the invention, such an embodiment will be more particularly described but it is to be understood that the particular description is intended as illustrative and not as defining the limits of the invention.

The invention aims to provide an instrument of high accuracy adaptable for indicating the direction and magnitude of yaw of the airplane in flight or for indicating the angle of attack of the airplane.

Another object is to provide such an instrument in which the indicating element is effectively damped to minimize oscillation.

A further object is to provide a small, compact instrument of light weight for the purpose indicated.

The invention provides an instrument comprising a yaw head having air pressure inlets at an angle to each other, said inlets tapping the fluid pressure at points in the flow around the yaw head such that differential pressure results when the plane of symmetry of the yaw head is not headed exactly in the fluid stream direction, and means actuated by the differential fluid pressure to turn the yaw head so that it will face directly into the fluid stream with the pressure in the two inlets equal.

The nature and objects of the invention will be better understood from a description of an illustrative embodiment thereof for the purposes of which description reference should be had to the accompanying drawings forming a part hereof and in which Figure 1 is a top plan view of a yaw indicator which is constructed in accordance with the principles of the invention.

Fig. 2 is a central, sectional view taken on the line 2—2 of Fig. 1.

Fig. 3 is a detailed view of the yaw head of the instrument.

Fig. 4 is a sectional view taken on the line 4—4 of Fig. 2.

Fig. 5 is a sectional view taken on the line 5—5 of Fig. 2.

The instrument shown comprises an air-stream sensitive element 5 having apertures 6 and 7 positioned at an angle of about 60° to each other and at equal angles to the plane of symmetry of the element. As the element turns relative to the air-stream, as when the airplane changes its attitude in the air-stream or when a cross air current is encountered, to bring one aperture or the other to face more directly into the air-stream, the air pressure in that aperture will be increased and the pressure in the other aperture will be correspondingly decreased. If in use the instrument is suitably positioned with the element 5 vertical and facing into the air-stream, then the element serves as a yaw head for indicating yaw. If the instrument is positioned with the element 5 projecting horizontally into the air-stream, then the device may be adapted to indicate the angle of attack of the aircraft.

Inasmuch as the element 5 is of the same construction whether used in vertical, horizontal or other position, it will be referred to for convenience in this specification and in the claims as a "yaw head" but it will be understood that the term is used in the illustrative and not in a restrictive sense. The yaw head 5, preferably circular in cross section, is arranged to show by its position the direction of the air-stream against its forward face and against the apertures 7 and 6. Means are provided whereby if the pressure in one aperture is greater than in the other because that aperture is turned more directly into the air current, then the air pressure will cause the yaw head to turn toward a position facing directly into the air-stream until the pressures at both apertures are equal; in other words, until the pressure differential is reduced to zero and ceases to cause turning of the yaw head. Pins 8 limit the lateral movement of the yaw head.

The means shown for turning the yaw head more directly into the air-stream upon the occurrence of deviation comprises a piston or vane 10 secured to a central rock shaft 11 to swing in the sector cylinder or arcuate chamber 12 in the casing 13. A partition 15 secured in the casing separates the two ends of the sector cylinder. Sufficient clearance is provided between the inner edge of the partition 15 and the rock shaft 11 and between the outer edge of the piston 10 and the wall of the cylinder to permit free movement of the piston in response to air pressure on one side or the other while restricting the leakage of air to within permissible limits. As shown, the piston comprises an outer frame and a thin diaphragm all of light weight and low inertia. Air entering the aperture 6 passes upward (see Fig. 2) at one side of a central partition 16 in the element 5 and out through the drill hole 17 to groove 18 and thence through passage 19 in the casing 13 and passage 20 of the partition 15 into the cylinder on one side of the piston 10. Aperture 7 is similarly connected by a suitable conduit including groove 18' and passageway 20' to the cylinder 12 on the opposite side of the piston 10. The higher pressure of air from the aperture which faces the more directly into the air-stream serves to rotate the piston 10 and rock shaft 11 which through pinion 21 and gear sector 22 keyed to the upper end (Fig. 2) of the yaw head 5 turns the yaw head more directly into the air-stream to reduce the angle of incidence of the air at one aperture and increase the angle of incidence at the other aperture. Pinion 21 and gear sector 22 provide a reduction gearing of a ratio of about 1 to 10. Rock shaft 11 is mounted in suitable anti-friction bearings as indicated at 23 and 24. The yaw head 5 is also mounted in suitable anti-friction bearings 25 and 26. A bracket 28 secured to the cover 29 of the casing 13 provides support for the bearing 23 and also provides support for a dial 30 held fixed in adjusted position by a nut 31. Hand 32, secured to the shaft 11 above the pinion 21, extends sufficiently into proximity to the dial 30 for convenient reading. The hand 32 is insulated from shaft 11 and pinion 21.

The arrangement shown provides in operation an effective damping of the jaw head which for most uses is sufficient without adding further special damping means. In part the damping is effected by the restricted flow of air through the relatively small conduits and in part by the change of air pressure against the piston as the yaw head approaches the neutral indicating position. The conduits may be designed to provide the desired damping or adjusting screws 33 may afford means for controlling the degree of damping.

Ordinarily, in aircraft, the instrument, whether operating as a jaw indicator or an angle of attack indicator, will be positioned remote from the pilot. Accordingly, it is desirable to provide for transmission of the indications by telemetry to a suitable indicator hand 32' on the pilot's instrument board. For this purpose, a resistance 35 is indicated as supported by the dial to be engaged by the hand 32. This resistance may serve as a potentiometer or as one branch of a Wheatstone bridge circuit of a transmitting system.

The foregoing description illustrates one application of the invention but it will be understood that the invention is capable of other uses such as indicating the direction of flow in various fluids. Various modifications of the structure described and other adaptations can be made without departing from the scope of the invention as defined in the appended claims.

I claim:

1. In an instrument of the character described, in combination, an angularly movable yaw head having a pair of fluid pressure apertures positioned at an angle to each other, a reversible fluid motor connected to the jaw head to move it into the direction of the fluid stream and conduits leading from the fluid pressure apertures of the jaw head to the motor to supply actuating fluid pressure to the motor.

2. In an instrument of the character described, in combination, an angularly movable yaw head having forwardly open apertures lying at an angle to each other, a cylinder, a movable piston within said cylinder, conduits arranged to connect the apertures respectively to opposite sides of the movable piston and gearing actuated by the movable piston to turn the yaw head in one direction or the other as the fluid pressure at one of the apertures is greater or less than the fluid pressure at the other aperture.

3. In an instrument of the character described, in combination, an angularly movable yaw head having a pair of apertures positioned at an angle to each other, an arcuate cylinder, a piston pivoted for arcuate movement in said cylinder, conduits for connecting the apertures respectively with the cylinder on opposite sides of said piston, and reduction gearing actuated by said piston for turning said yaw head.

4. In an instrument of the character described, in combination, an angularly movable yaw head having a pair of air pressure apertures positioned at an angle to each other, pressure responsive mechanism connected to the yaw head to move it in opposite directions comprising a piston and conduits leading air from the apertures respectively to opposite sides of the piston.

5. In an instrument of the character described, in combination, an angularly movable yaw head having a pair of fluid pressure apertures positioned at an angle to each other, a reversible motor connected to the yaw head to turn it angularly into the direction of the air stream and connections between the fluid pressure apertures and the motor to control the operation of the motor.

AUGUST RASPET.

REFERENCES CITED

The following references are of record in the file of this patent:

UNITED STATES PATENTS

| Number | Name | Date |
|---|---|---|
| 1,714,373 | Johnson | May 21, 1929 |
| 2,279,892 | Reichel | Apr. 14, 1942 |
| 2,237,306 | Hood | Apr. 8, 1941 |
| 2,343,288 | Fink | Mar. 7, 1944 |